(12) United States Patent
Delorme

(10) Patent No.: US 6,377,603 B1
(45) Date of Patent: Apr. 23, 2002

(54) SYSTEM FOR THE ASSEMBLY OF A SELF-BAKING COMPOSITE ELECTRODE FOR ELECTRIC ARC FURNACES

(75) Inventor: Raymond Delorme, Mouxy (FR)

(73) Assignee: Invensil, Chambery (FR)

( * ) Notice: Subject to any disclaimer, the term of this patent is extended or adjusted under 35 U.S.C. 154(b) by 0 days.

(21) Appl. No.: 09/624,767

(22) Filed: Jul. 25, 2000

(30) Foreign Application Priority Data

Aug. 19, 1999 (FR) .............................. 99 10706

(51) Int. Cl.⁷ .............................. H05B 7/09; H05B 7/14
(52) U.S. Cl. .............................. 373/92; 373/89; 373/91; 373/94; 373/97
(58) Field of Search .............................. 373/88, 89, 91, 373/92, 94, 97, 98, 100; 204/225, 288.2, 294

(56) References Cited

U.S. PATENT DOCUMENTS

| | | | |
|---|---|---|---|
| 3,819,841 A | * 6/1974 | Persson | ........................ 373/89 |
| 4,575,856 A | 3/1986 | Persson | ........................ 373/89 |
| 5,351,266 A | * 9/1994 | Bullon Camarasa et al. | . 373/89 |
| 5,577,065 A | 11/1996 | Sales | ............................ 373/89 |
| 5,854,807 A | * 12/1998 | Boisvert et al. | ............... 373/89 |

FOREIGN PATENT DOCUMENTS

| | | |
|---|---|---|
| EP | 0 229 968 | 7/1987 |
| EP | 0 559 390 | 9/1993 |

* cited by examiner

Primary Examiner—Tu Ba Hoang
(74) Attorney, Agent, or Firm—Connolly Bove Lodge & Hutz LLP

(57) ABSTRACT

A system is disclosed for assembling a composite, self-baking electrode for electric arc furnaces. The electrode includes an outer metal ferrule, a central column of prebaked carbon or graphite sections assembled by nipples. New sections are added to the column from carbon paste placed between the ferrule and the central column. The assembling system principally includes a support that is vertically mobile over a length greater than the length of each of the sections. The support suspends the central column. A device is provided for temporarily blocking the column and a clamping device applies a preset torque to a newly added section while the blocking device temporarily blocks the column from movement thereby screwing the newly added section to an adjacently positioned section of the column.

3 Claims, 1 Drawing Sheet

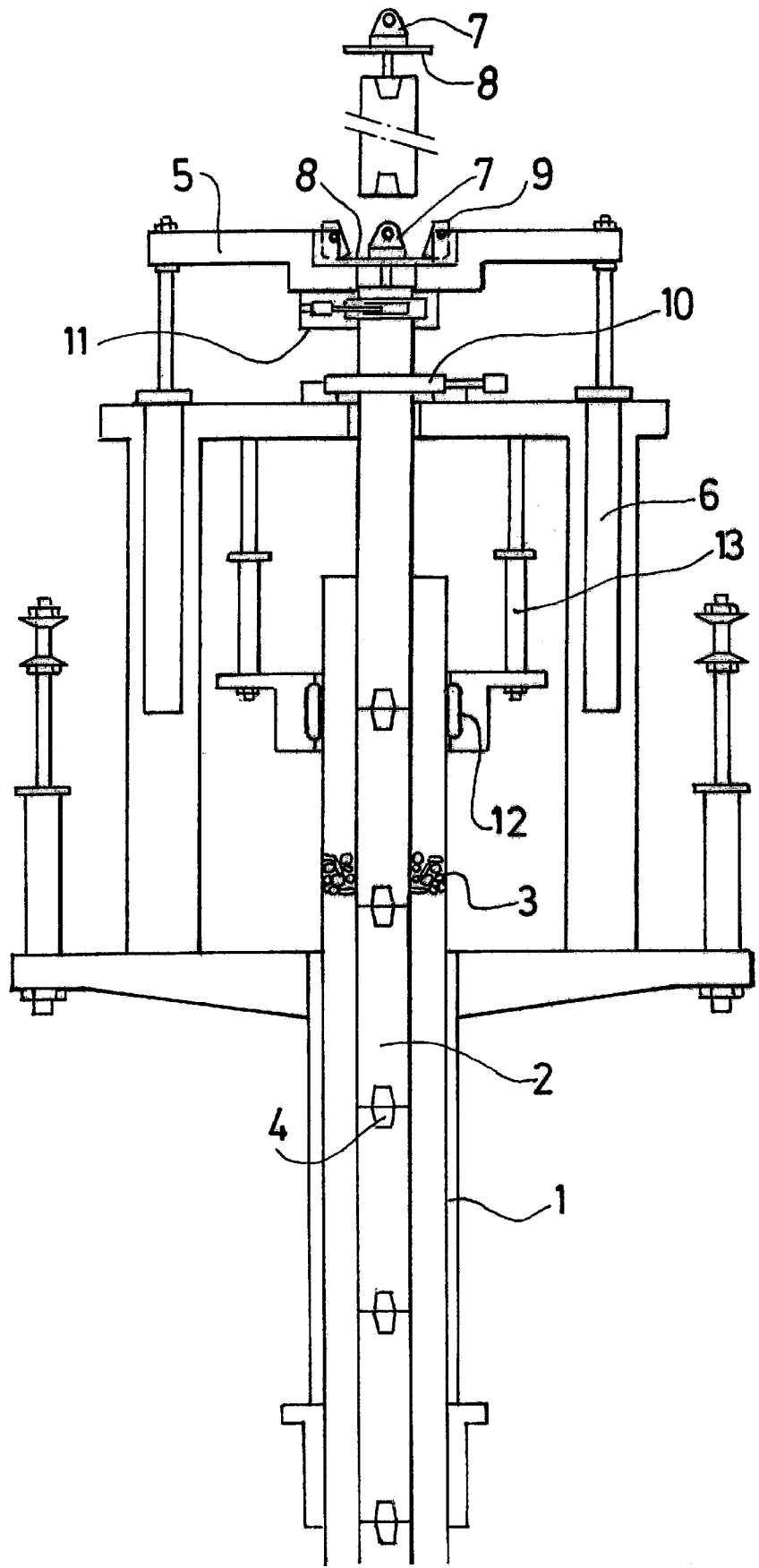

SYSTEM FOR THE ASSEMBLY OF A SELF-BAKING COMPOSITE ELECTRODE FOR ELECTRIC ARC FURNACES

FIELD OF THE INVENTION

This invention concerns a self-baking electrode, or Söderberg electrode, intended for an electric arc furnace, in particular a furnace for producing metallurgical silicon, comprising a central column made up of a succession of pre-baked electrodes in carbon or graphite, an outer metal ferrule and carbon paste undergoing baking between the central column and the ferrule.

BACKGROUND OF THE INVENTION

The principle of the self-baking electrode has been known since 1917 under a patent filed by Det Norske Aktieleskap for Elektrokemisk Industri (FR 488778) and its inventor C. W. Söderberg gave it his name. The electrode is baked in the electric furnace itself using a carbon paste that is continually supplied inside a ferrule in steel comprising fins to support the electrode. With this technique, the lower part of the ferrule dissolves in the bath of molten metal imparting iron to the bath, which may be a hindrance in particular in the case of silicon.

To avoid contamination by iron, several solutions have been put forward which all consist of mechanically detaching the electrode and the ferrule so that the electrode can be caused to slide without the ferrule. It suffices to use a smooth ferrule without fins, but in this case a mechanical assembly must be provided so that the weight of the electrode can be given other support. This assembly is generally a piece inserted in the paste during baking, which consumes itself at the same time as the electrode, for example a strip of perforated steel as in patent IT 606568 filed in 1959 by the Edison company, or a column which forms a prebaked electrode in carbon or graphite, made up of elements assembled together by means of nipples as in patent U.S. Pat. No. 457,856 by J. A. Persson filed in 1984. Patent FR 2683421, filed by the Carburos Metallicos company describes various adaptations of this technique. Patent FR 2724219 by Pechiney Electrometallurgie proposes the suspension of the central column from a support that is vertically mobile over a distance that is greater than the length of each of the unit elements forming the central column.

The purpose of the invention is the improve this latter system such as to provide greater safety and increased reliability in the functioning of the electrode, by improving the assembly of elements forming the central column.

BRIEF DESCRIPTION OF THE INVENTION

The subject of the invention is a system for the assembly of a self-baking composite electrode for electric arc furnaces, this electrode comprising an outer metal ferrule, a central column in pre-baked carbon or graphite formed of a plurality of elements assembled by nipples, and carbon paste placed between the ferrule and the central column, this system comprising a support that is vertically mobile over a distance that is greater than the length of each of the elements and is used to suspend the central column, and a temporary blocking device for the column, characterised in that it is equipped with a mechanism which, in co-operation with the temporary blocking device for the column, permits the application of a clamping torque of pre-set value between a new element and the central column to which this new element is to be screwed.

DETAILED DESCRIPTION OF THE INVENTION

The invention will be described with reference to the single figure which shows an axial section view of an example of embodiment of the composite electrode assembly system.

As described in patent FR 2724219, the electrode properly so-called comprises a cylindrical metal ferrule 1, a central column 2 and, in the space between the ferrule and the central column, carbon paste 3 that is inserted via the top part and bakes gradually as it moves downwards. The central column 2 that is cylindrical and has the same axis as the ferrule, is made up of generally identical elements in pre-baked carbon or graphite, provided at their two ends with threaded conical holes and assembled together by nipples 4, that is to say conical dual-threaded connectors made in the same material and screwed onto the two elements to be assembled. The assembly system comprises a support 5 that is vertically mobile in relation to the ferrule 1 by means of two jacks 6, whose stroke is greater than the length of the elements forming column 2. The upper element of the central column is fixed to the mobile support 5 by means of a metal piece 7 whose end reproduces the thread of nipples 4. When, after the successive sliding movements required to offset the continuous consumption of the electrode, the jacks 6 arrive at the end of their stroke, column 2 is temporarily blocked using the support of temporary blocking device 10 for the time that is needed to remove the fixation piece 7, to return the jacks 6 back upwards and to add a new element to the top of column 2.

In the system corresponding to patent FR 2724219, this new element was screwed in place manually or using a dynamometric key on the element positioned immediately underneath. If clamping was insufficient, there was a risk that the column would not be properly supported and the assembly might come loose; on the contrary, if clamping was too tight, the thread of the element could deteriorate.

In the improved assembly of the present invention, when it is required to add a new element to the top of the column, piece 7 fitted with a collar 8 is removed, a new element provided at its top end with a new piece 7 is lowered onto the top of the column 2 by means of a winch. When the collar 8 of piece 7 reaches support 5, the new element press-fits into position under its own weight through pivoting pieces 9 and comes to be properly positioned just above column 2. The clamping torque between the new element and column 2 is assured by blocking device 10 and clamping mechanism 11 which permit application of a perfectly defined clamping torque by controlling the oil pressure in the hydraulic jack commanding mechanism 11. The sliding of the electrode is controlled by means of jacks 6, the manoeuvre being conducted with clamping of the ferrule by belt 12 so as to hold ferrule 1 during the sliding movement. Taking into consideration the need to extend the ferrule from time to time, the same manoeuvre is used for this purpose as previously but in this case by simultaneously sliding ferrule 1 by means of jacks 13 and the electrode by means of jacks 6. The positioning of the electrode in the furnace, controlled by electric adjustment of the furnace, is made in identical fashion to the method described in patent FR 2724219.

With the system of the invention it is possible to make the addition of new elements to column 2 by considerably reducing the risk of breakage of this column and hence the stoppage rate of furnaces which is reduced by 75%, decreasing from 2% to 0.5%. Moreover, this increased safety means that it is possible to reduce the diameter of column 2 by approximately 10% compared with the prior art, which reduces costs, the Sôderberg paste being far less costly that pre-baked electrodes.

What is claimed is:

1. A system for assembling a composite, self-baking electrode for electric arc furnaces, the electrode comprising an outer metal ferrule, a central column of prebaked carbon or graphite sections assembled by nipples, new sections added to the column from carbon paste placed between the ferrule and the central column, the assembling system comprising:

a support that is vertically mobile over a length greater than the length of each of the sections, the support suspending the central column;

means for temporarily blocking the column;

clamping means for applying a preset torque to a newly added section while the blocking means temporarily blocks the column from movement thereby screwing the newly added section to an adjacently positioned section of the column.

2. The assembly system of claim 1 together with a connection piece that is press fitted to the support for fixing the central column to the support.

3. The assembly system of claim 1 together with an electric arc furnace located near the assembly system for utilizing the electrode during production of metallurgical silicon.

* * * * *